United States Patent
Legrand et al.

(10) Patent No.: US 6,590,941 B2
(45) Date of Patent: Jul. 8, 2003

(54) SEMI-NDA FREQUENCY CORRECTION AT THE RECEIVING END IN A PACKET TRANSMISSION SYSTEM

(75) Inventors: Delphine Legrand, Paris (FR); Antoine Chouly, Paris (FR); Americo Brajal, Villeneuve le Roi (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 25 days.

(21) Appl. No.: 09/910,210

(22) Filed: Jul. 20, 2001

(65) Prior Publication Data
US 2002/0034265 A1 Mar. 21, 2002

(30) Foreign Application Priority Data
Jul. 25, 2000 (EP) .............................. 00402125

(51) Int. Cl.$^7$ .................. H04L 27/06; H04L 27/16; H04L 27/22; H04L 7/00; H03K 9/00
(52) U.S. Cl. .................. 375/316; 375/329; 375/365
(58) Field of Search .................. 375/316, 365, 375/329, 344; 455/164.1

(56) References Cited

U.S. PATENT DOCUMENTS

| | | | |
|---|---|---|---|
| 4,937,841 A | | 6/1990 | Chuang et al. ............... 375/94 |
| 5,202,901 A | * | 4/1993 | Chennakeshu et al. ..... 375/331 |
| 5,724,396 A | * | 3/1998 | Claydon et al. ............ 375/355 |
| 5,946,359 A | * | 8/1999 | Tajiri et al. ................. 375/331 |
| 6,400,784 B1 | * | 6/2002 | Ben-Eli ....................... 375/365 |

FOREIGN PATENT DOCUMENTS

WO    WO9836580    2/1998

OTHER PUBLICATIONS

Morelli et al, Feedforward Carrier Frequency Estimation with MSK–Type Signals, IEEE, 1998, pp. 235–237.*
Morelli et al, Decomposition of M–ary CPM signals into PAM Waveforms, IEEE, 1995, pp 1265–1275.*
Morelli et al, Joint Frequency and Timing Recovery for MSK–Type Modulation, IEEE, 1999, pp 938–946.*
Morelli et al, Feedforward ML–Based Timing estimation With PSK Signals, IEEE, 1997, pp 80–82.*
Wang, Ottoson, "Initial Frequency Acquisition in W–Codma", IEEE Vehicular Technology Conference, vol. 2 Conf. 50, Sep. 19–22, 1999, pp. 1013–1017, XP000924663.
Article: "Feedforward Frequency Estimation for PSK: a Tutorial Review" by M. Morelli and U. Mengali, Published in the magazine European Transactions on Telecommunications, vol. 9, No. 2, Mar.–Apr. 1998, pp. 103–116.

* cited by examiner

Primary Examiner—Mohammad H. Ghayour
Assistant Examiner—Tony Al-Beshrawi
(74) Attorney, Agent, or Firm—John Vodopia (57) ABSTRACT

A method of estimating the frequency at the receiving end for a packet transmission system, for estimating a carrier frequency error between received symbols ($r_k$) and transmitted symbols ($c_k$). An error function ($H(\Delta f)$) defined for minimizing a magnitude which is representative of an average distance between the received symbols compensated in phase ($r'_k$) and estimations of the received symbols affected by a frequency error estimation ($\hat{c}_k e^{j2\pi k\Delta\hat{f}}$) is computed. The estimations of the received symbols affected by the frequency error estimation are obtained by varying the frequency error ($\Delta\hat{f}$) in an acquisition interval ($[-f_{max}, +f_{max}]$) for estimations of the transmitted symbol ($\hat{c}_k$). The estimations of the transmitted, symbols ($\hat{c}_k$) are obtained based on a threshold relating to the phase of the received symbol which is compensated in phase ($r'_k$), in the case of a modulation of the PSK type. For a modulation of the QPSK (Quadrature PSK), the threshold decision is based on the sign of the real and imaginary parts of the received, phase-compensated symbol ($r'_k$).

20 Claims, 4 Drawing Sheets

SEMI-NDA FREQUENCY CORRECTION AT THE RECEIVING END IN A PACKET TRANSMISSION SYSTEM

The invention relates to the correction of the carrier frequency at the receiving end in a packet transmission system.

The invention finds important applications, notably in the synchronization of multi-user transmission systems by way of satellite or cables with return paths, in which a plurality of terminals are capable of transmitting data packets to a head station in accordance with a frequency and time-division multiplex system.

These terminals are generally intended for consumers. It is thus important to reduce their cost price. It is therefore advantageous to use low-cost local oscillators, i.e. relatively inaccurate oscillators, for generating the carrier frequencies to be used in the transmissions from the terminals to the head station, usually referred to as ascending transmissions. Typically, the oscillators used have an accuracy which varies between 1 ppm and 10 ppm. The resultant error in the generated carrier frequency is proportional to the carrier frequency and is larger as the frequencies used are higher. For example, in the satellite transmission systems which use the frequency band Ka (20 GHz–30 GHz) for the ascending transmissions, the difference or frequency error observed for a local oscillator having an accuracy of 1 ppm may reach +30 kHz (i.e. for a symbol frequency of 100 kHz, the normalized frequency difference with respect to the symbol frequency is +30%).

The article "Feedforward Frequency Estimation for PSK: a tutorial review" by M. Morelli and U. Mengali, published in the magazine European Transactions on Telecommunications, volume 9, no. 2, March–April 1998, pages 103–106 describes a frequency estimator which is based on an algorithm named after its authors Rife and Boorstyn for estimating a frequency error between the carrier at the transmitting end and that at the receiving end. This error is within a normalized frequency range of $\pm\frac{1}{2}$ with respect to the symbol frequency $\Delta f/B$ (in which $\Delta f$ is the frequency error and B is the symbol frequency). In the description hereinafter, the estimation of the normalized frequency distance to be determined (equal to $\Delta f/B$ or to $\Delta f \times T_S$ where $T_S$ is the duration of the symbol) will be denoted as $\Delta \hat{f}$.

The carrier frequency estimators may be characterized by different parameters, notably the accuracy of the estimation obtained, the size of the acquisition range of the frequency difference, denoted $\pm \Delta f_{max}$, the minimum level of the signal-to-noise ratio SNR of the treated signal, and the complexity of the algorithm. Some of these parameters have opposed evolutions. Particularly, the accuracy of the estimation is smaller as the acquisition range $\pm \Delta f_{max}$ is larger, with an equal complexity. On the other hand, the estimators are all the more complex as they are capable of functioning at low signal-to-noise ratios. Rife and Boorstyn have shown that the frequency error $\Delta \hat{f}$ (or $\Delta f \times T_S$) has a maximum probability of being situated on both sides of the maximum of the amplitude with the following discrete function, denoted $Z(\Delta \hat{f})$:

$$Z(\Delta \hat{f}) = \frac{1}{L}\sum_{k=0}^{L-1} z(k) \times e^{-j2\pi k \Delta \hat{f}} \quad (1)$$

in which L is the observation length, i.e. the number of received symbols used for computing the error estimation, k represents the position of the symbol in the received packet, with $z(k)=r(k)/c_k^*$ if the received symbols are known, where $c_k^*$ is the conjugated complex of the predetermined known symbol $c_k$ and where $r(k)$ is the symbol received with a frequency error $\Delta f$ with $r(k)=c_k \times e^{j(2\pi k \Delta f T_S + \phi_0)}+n(k)$ where $\phi_0$ is the initial phase shift between the local oscillator used at the receiving end and that used at the transmitting end (this phase shift may be different for each packet and may correspond to the phase shift for k=0) and where n(k) represents the noise in the channel, and with $z(k)=e^{jM \, arg|r(k)|}$ if the symbols received are not known in advance, where M is the number of phases of the used modulation of the type PSK (Phase Shift Keying) but in this case the result obtained must be divided by M for obtaining the estimation $\Delta \hat{f}$.

It is particularly an object of the invention to provide a more accurate estimation of the frequency error in a packet transmission system in which the data packets can be transmitted by different transmitters and are susceptible to different frequency shifts at the receiving end. The frequency correction method according to the invention is of the semi-NDA type (Non-Data Aided) i.e. it does not use known data for realizing the frequency error estimation but, in contrast, requires only a previously effected phase error estimation. This method is thus particularly suitable for packet transmission systems without a preamble and is adapted to the signals which are modulated in accordance with a phase modulation of the PSK type as well as to signals which are modulated in accordance with a quadrature amplitude modulation of the QAM type (Quadrature Amplitude Modulation).

To this end, the invention provides a method of estimating the frequency at the receiving end for a packet transmission system, for estimating a carrier frequency error between received symbols ($r_k$) and transmitted symbols ($c_k$). The method comprises the computation of an error function ($H(\Delta \hat{f})$) for error values ($\Delta \hat{f}$) comprised in an acquisition interval ($[-f_{max}, +f_{max}]$). It derives therefrom an estimation ($\Delta \hat{f}_0$) of said carrier frequency error. The error function ($H(\Delta \hat{f})$) is defined for minimizing a magnitude which is representative of an average distance between the received symbols which are compensated in phase ($r'_k$) and estimations ($\hat{c}_k e^{j2\pi k \Delta \hat{f}}$) of the received symbols affected by a frequency error estimation. These are obtained by varying the frequency error ($\Delta \hat{f}$) in the acquisition interval ($[-f_{max}, +f_{max}]$) for estimations of the transmitted symbol ($\hat{c}_k$). These estimations of the transmitted symbol ($\hat{c}_k$) are obtained by means of a decision based on a threshold relating to the received symbol which is compensated in phase ($r'_k$). For a modulation of the QPSK type (Quadrature PSK), the threshold decision is made on the basis of the sign of the real and imaginary parts of the received, phase-compensated symbol ($r'_k$).

It is possible to obtain a good performance with the invention when the frequency error to be estimated is low, of the order of 1%. For this reason, when the real error is more important, the method according to the invention will be preferably effected after a first estimation of the frequency error computed in accordance with a conventional method of the DA type (Data Aided) using, if possible, data from the preamble of the transmitted packets or, if the packets do not have a preamble, a method of the NDA type as described in the quoted article. The residual error may then be advantageously estimated by means of the method according to the invention.

In a transmission system in which the data packets may originate from different transmitters having different frequency errors and in which each transmitter transmits at distinct instants and is susceptible of transmitting each packet with a different error, it is not possible to correct the frequency error continuously. For example, the receiver in the head of the network must perform a correction on each received packet. However, there is a probability that the frequency errors for a given transmitter vary more or less in accordance with a function which is more or less known or can be fairly easily approximated. For this reason it is interesting to use the estimation computed for the last packet or packets transmitted by a given transmitter for fixing the acquisition range of the error to be corrected in the next packet.

In accordance with a characteristic feature of the invention the acquisition range ($[-f_{max}, +f_{max}]$) may be fixed for a given transmitter as a function of the estimation which has been previously computed for the packets received from this transmitter.

These and other aspects of the invention are apparent from and will be elucidated, by way of non-limitative example, with reference to the embodiments described hereinafter.

Figure 1:
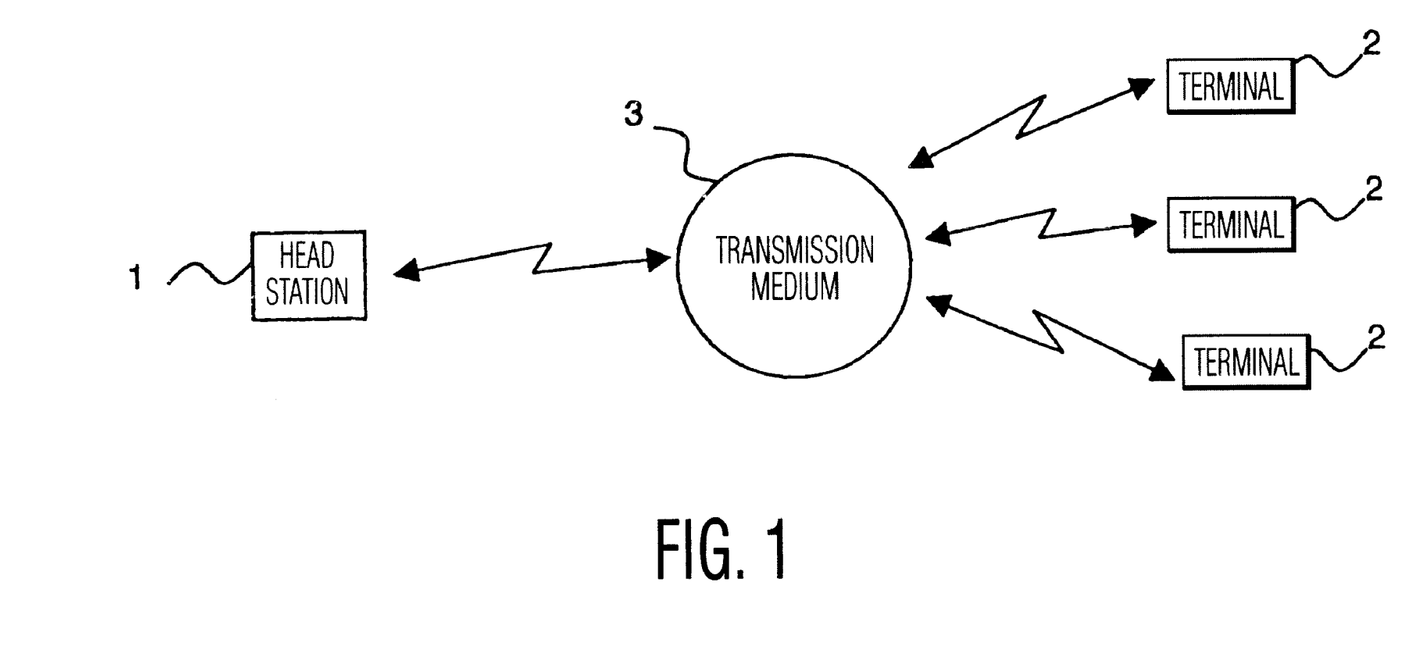
FIG. 1 shows an embodiment of the transmission system according to the invention.

A transmission system according to the invention is shown by way of example in FIG. 1. It comprises a head station 1 and a plurality of interactive terminals 2 which are capable of transmitting data to the head station by access to a transmission medium 3. Such transmissions from the terminals to the head station are qualified as ascending transmissions. In ascending transmissions, the head station 1 has the function of a receiver. The access of the terminals to the transmission medium may be effected, for example, by using an FDMA mechanism (Frequency Division Multiple Access) combined with a TDMA mechanism (Time Division Multiple Access). The transmission medium may be of different types, for example, cable, radio or satellite.

In a frequency division multiple access system, a carrier frequency is attributed to each terminal for transmitting data to the head station. As the terminals are provided with inaccurate local oscillators, the carrier frequency effectively used for a terminal has an error which may be relatively large at the carrier frequency which should have been used in theory. When the frequency division is combined with a time division, different terminals may transmit data in consecutive time intervals by using different carrier frequencies, with different frequency errors with respect to the theoretical frequencies which should have been used. The head station thus has little time to perform the operations relating to the carrier frequency correction of the received signals.

It is an object of the invention to estimate and very rapidly correct the frequency difference between the received signal and the theoretical carrier. This estimation and correction may be made for each new packet received from any one of the terminals of the system. It applies particularly to systems of the NDA type where all the transmitted symbols are not known a priori, after a temporal synchronization of the received symbols has been obtained and after the initial phase error between the local oscillators used at the transmitting and receiving ends has been correctly estimated. In an NDA system, and on condition that the frequency error is sufficiently low for a sufficiently high signal-to-noise ratio, the initial phase error may be estimated by means of the following technique. The transmitted symbols are first estimated by means of, for example, a threshold decision on the received symbols. A phase estimation is computed by way of the difference between the phases of the received symbols and those of the estimated symbols. An average phase error estimation may then be obtained by averaging the results for several received symbols. The remaining ambiguity in the phase is resolved by means of a conventional decoding algorithm. In these NDA systems, the invention is particularly advantageous for a modulation of the MPSK type in which the phase of the transmitted symbols is known to be about $2\pi/M$.

Figure 2:
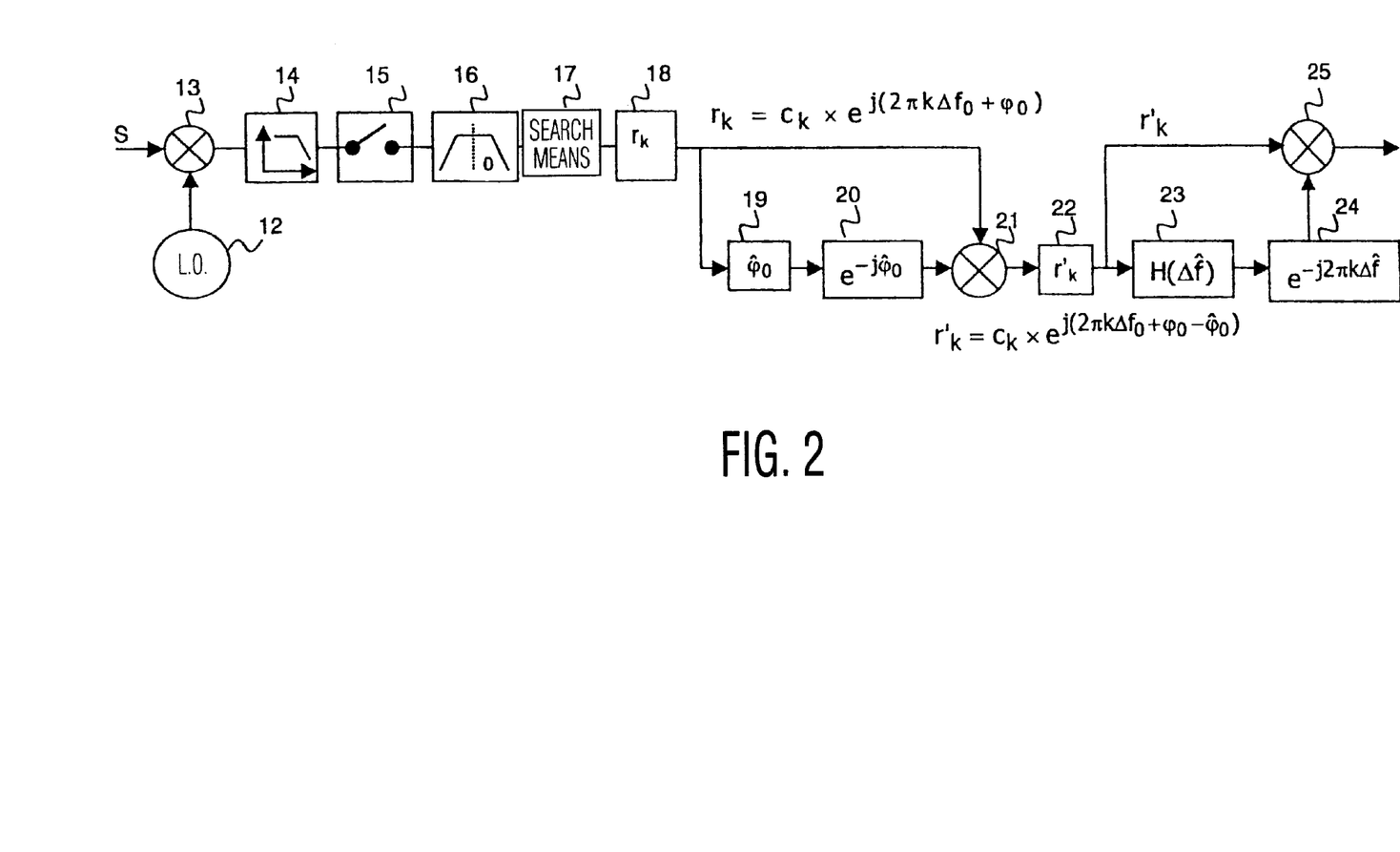
FIG. 2 shows the diagram of an embodiment of the receiver according to the invention.

FIG. 2 shows a general diagram of an embodiment of the receiver according to the invention. It comprises a local oscillator 12 and a mixer 13 for transposing the received signal S in such a way that the spectrum of the transposed signal is centered at zero plus or minus a frequency error $\Delta f$. The transposed signal is filtered by a rejection filter 14 for eliminating the frame frequencies around 2Fp, where Fp is the transmission frequency (i.e. the theoretical carrier frequency of the received signal), as well as the adjacent channels. The signal obtained at the output of the filter 14 is sampled by an oversampling device 15 which takes a certain number of samples for each symbol of the transposed signal. The samples taken are subsequently filtered by a filter 16, referred to as optimal filter, which is adapted to the filter used at the transmitting end. It is a low-pass filter of the Nyquist edge type centered around zero. Means for searching the optimal sampling instant 17 select a sample from N samples available at the output of the low-pass filter 16. The samples supplied by the search means 17 are stored in a first memory 18. In this example, it is supposed that the temporal synchronization of each received packet is realized before performing the estimation of the phase error after that of the frequency error. A phase estimator 19 is provided for estimating the initial phase error, denoted $\Phi_0$, between the oscillator used at the transmitting end and that used at the receiving end, on the basis of samples stored in the first memory 18. The phase estimator 19 may use, for example, a method of the DA type using known transmitted data, notably data from the preamble of the transmitted symbols. For example, this method may consist of a comparison of the received symbols and the transmitted symbols for deriving the average phase error. The estimation obtained is denoted $\hat{\Phi}_0$. A phase correction is realized for each sample at the symbol frequency by means of a first exponentiation means 20 which computes the exponential function $e^{-j\hat{\Phi}_0}$. Once the initial phase has been estimated and corrected, a multiplier 21 multiplies the received signal $r_k$ by the signal supplied at the output of the first exponentiation means 20 for obtaining a phase-corrected signal, denoted $r'_k$, stored in a second memory 22. A frequency estimator 23 can then estimate the frequency error in the stored, phase-corrected signal $r'_k$. The frequency estimator 23 supplies an error estimation denoted $\Delta \hat{f}$ at the output. This estimation is obtained by a method of error estimation as described hereinafter with reference to FIG. 3. Once the error estimation $\Delta \hat{f}$ is available at the output of the estimator 23, a second exponentiation means 24 computes the exponential function $e^{-2\pi jk\Delta\hat{f}}$, where k is the index of the current sample stored in the memory 22, for providing the result to correction means 25. The correction means 25 have the function of correcting the frequency error with respect to the phase-corrected signal r'$_k$. To this end they receive the exponential function $e^{-2\pi jk\Delta\hat{f}}$, on the one hand, and the received, phase-compensated signal r'$_k$ stored in the memory 22, on the other hand, for effecting a multiplication between the two signals. The product obtained is a phase and frequency-corrected symbol corresponding to the transmitted symbol c$_k$ which must be subsequently transmitted to conventional decoding means. The latter means do not relate to the invention and are not shown in FIG. 2.

Figure 3:
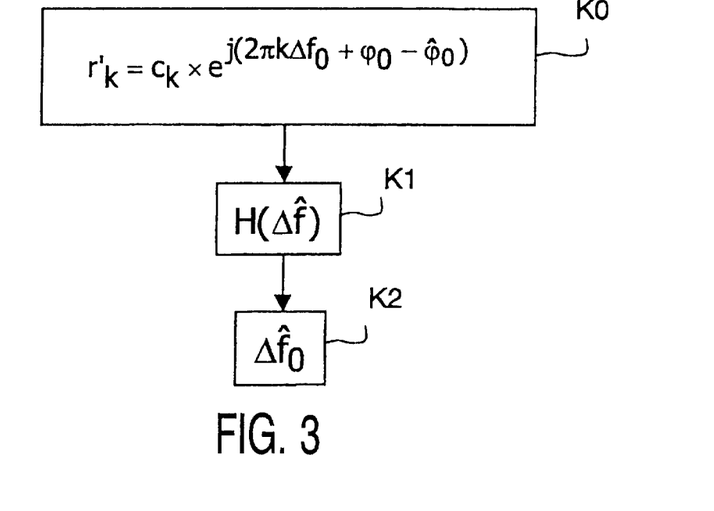
FIG. 3 shows an embodiment of the method according to the invention.

FIG. 3 shows the different steps of an embodiment of a method of estimating the frequency error at the receiving end for a packet transmission system according to the invention, which can be particularly realized by the frequency estimator 23 shown in FIG. 2. The method is intended to estimate a carrier frequency error between received, phase-compensated symbols r'$_k$ and transmitted symbols c$_k$. It comprises:

- a receiving step K0 for receiving the received, phase-corrected symbols r'$_k$, denoted r'$_k$=c$_k$×e$^{j(2\pi k\Delta f_0-\phi_0)}$
- a computing step K1 for computing an error function H($\Delta\hat{f}$) for possible error values $\Delta\hat{f}$ comprised in an acquisition interval [-f$_{max}$, +f$_{max}$] and for deriving an estimation $\Delta\hat{f}_0$ of said carrier frequency error,
- a correction step K2 for correcting the received symbols r'$_k$ by means of the estimation $\Delta\hat{f}_0$.

The error function H($\Delta\hat{f}$) is defined to minimize a magnitude which is representative of an average distance between the symbols r'$_k$ and estimations of the received symbols affected by a frequency error estimation. These are obtained by varying the frequency error $\Delta\hat{f}$ in the acquisition interval [-f$_{max}$, +f$_{max}$] for estimations of the transmitted symbol ĉ$_k$. The estimations of the transmitted symbol c$_k$ are obtained by means of a threshold-based decision relating to the phase of the symbol r'$_k$. For a modulation of the PSK type, the threshold decision is based on the phase of the received symbol. For a modulation of the QPSK type, in which the symbols are represented by complexes, the threshold decision is made on the basis of the sign of the real and imaginary parts of the symbol r'$_k$.

The method is used for a signal modulated in accordance with a modulation of the PSK type or the QAM type in which the synchronization at the symbol frequency has already been realized. It is supposed that the channel is affected by AWGN (Additive White Gaussian Noise). The received symbols may be expressed in accordance with equation (1):

$$r_k = c_k e^{j2\pi k\Delta f_0 + j\phi_0} + n_k \qquad (1)$$

in which:
- k represents the index of the symbol in the packet,
- c$_k$ are the data symbols of the alphabet of the modulation of the PSK type, at an average energy denoted E$_S$,
- $\Delta f_0$ is the frequency difference or error to be determined,
- $\phi_0$ is the initial phase error,
- n$_k$ is a complex representing additive white Gaussian noise having independent real and imaginary parts, each having a variance denoted $\sigma^2$=N$_0$/2.

It is also assumed in the method that the initial phase error $\phi_0$ has been correctly estimated. In this case, the received symbols may be defined by equation (2):

$$r'_k = c_k e^{j2\pi k\Delta f_0} + n_k \qquad (2)$$

An estimator of $\Delta f_0$, denoted $\Delta\hat{f}_0$ is then to be determined after a sequence of N received symbols r$_k$. Equation (3) gives an estimation of the frequency error according to the invention, using the principle of maximum probability:

$$\Delta\hat{f}_0 = \arg\left\{\min_{\hat{c}_k,\Delta\hat{f}}\left[\sum_{k=0}^{N-1}\left|r'_k - \hat{c}_k e^{j2\pi k\Delta\hat{f}}\right|^2\right]\right\} \qquad (3)$$

in which
- arg {min (F(x))} is the value of x corresponding to the minimum of F(x),
- $\hat{c}_k e^{j2\pi k\hat{f}}$ is an estimation of the received symbol.

By developing the square value, one obtains expression (4) which is equivalent to equation (3)

$$\Delta\hat{f}_0 = \arg\left\{\max_{\hat{c}_k,\Delta\hat{f}}\left[\sum_{k=0}^{N-1}\text{Re}\left(r'_k\hat{c}_k^* e^{-j2\pi k\Delta\hat{f}}\right)\right]\right\} \qquad (4)$$

where Re(x) is the real part of x and x* represents the conjugated complex of x.

The optimal choice for ĉ$_k$ is obtained by means of a decision based on a threshold relating to the phase of the received symbol. For a modulation of the MPSK type, zones in the form of sectors are defined in the plane, allowing the points of the constellation MPSK to be situated. M angular sectors define the M possible values of the transmitted symbol. The estimation of the transmitted symbol ĉ$_k$ is determined by marking the sector in which the received symbol is situated. In accordance with this estimation method used in the case of a modulation of the QPSK type, the transmitted symbol ĉ$_k$ may be simply determined with the aid of the sign of the real and imaginary parts of the received symbol r'$_k$. The real and imaginary parts of ĉ$_k$ are defined by equations (5) and (6), respectively:

$$Re(\hat{c}_k) = sgn[Re(r'_k)] \qquad (5)$$
$$Im(\hat{c}_k) = sgn[Im(r'_k)] \qquad (6)$$

where the symbol sgn(x) indicates the sign of x. By substituting (5) and (6) in (4), one obtains the expression (7) for estimating the frequency error:

$$\Delta\hat{f}_0 = \arg\left\{\max_{\Delta\hat{f}}\left[\sum_{k=0}^{N-1}\left|Re\left(r'_k e^{-j2\pi k\Delta\hat{f}k}\right)\right| + \sum_{k=0}^{N-1}\left|Im\left(r'_k e^{-j2\pi k\Delta\hat{f}k}\right)\right|\right]\right\} \qquad (7)$$

$$= \arg\left\{\max_{\Delta\hat{f}}(H(\Delta\hat{f}))\right\}$$

where the function H($\Delta\hat{f}$) depends on the received symbols and on the estimation $\Delta\hat{f}$(=$\Delta f \times T_s$).

For determining an estimation of the frequency error $\Delta\hat{f}$, one can compute the value of the function H($\Delta\hat{f}$) for all the possible error values and derive that one which represents the maximum of the function H($\Delta\hat{f}$). However, in the majority of cases, there is a range of values, referred to as acquisition range for the frequency distance and denoted [-f$_{max}$, +f$_{max}$] in which the frequency error is most likely to occur. The value f$_{max}$ may be computed in several ways. For example, if the error estimation according to the invention is effected after a first frequency error estimation in accordance with the Rife and Boorstyn method described in the quoted article, the value f$_{max}$ represents the maximum residual frequency obtained by means of the Rife and Boorstyn method.

If not, the acquisition range $[-f_{max}, +f_{max}]$ may be fixed by taking the performance of the transmitter/receiver apparatus used into account. Indeed, the terminals generally have a characteristic frequency error comprised in a maximum error range denoted $\pm\Delta f_0/B$ (where B is the symbol frequency) comprised in the interval $\pm\frac{1}{2}$. By computing the function $H(\Delta\hat{f})$ in an error range, denoted $\pm\Delta f_{max}/B$, with $\frac{1}{2} > \Delta f_{max}/B > \Delta f_0/B$, it is prevented that all the points comprised in the intervals $[-\frac{1}{2}; -\Delta f_{max}/B]$ and $[\Delta f_{max}/B; \frac{1}{2}]$ which are remote from the real error are computed. By fixing $f_{max}$ as a function of the real performance of the terminals, the number of computations is thus reduced, notably when the real average error of the terminal is small.

Once the interval $[-f_{max}, +f_{max}]$ is fixed, the estimation of the frequency error can be computed in only two steps. During the first step, the function $H(\Delta\hat{f})$ is computed for a discrete number of frequency error values comprised in the interval $[-f_{max}, +f_{max}]$ for determining the value, denoted $f_0$, which represents the maximum of the function in the computed values. The difference between two consecutive frequencies among the set of computed frequencies is denoted d. During the second step, the estimation of the frequency error can be obtained by means of a parabolic interpolation between the values of the function $H(\Delta\hat{f})$ taken at the points $f_0-d$ and $f_0+d$ as indicated in equation (8):

$$\Delta\hat{f} = b - \frac{1}{2} \times \frac{(b-a)^2[H(b)-H(c)] - (b-c)^2[H(b)-H(a)]}{(b-a)[H(b)-H(c)] - (b-c)[H(b)-H(a)]} \quad (8)$$

where $a=f_0-d$ and $b=f_0$ and $c=f_0+d$.

Other interpolation techniques may also be used, such as the techniques of approximating the maximum by way of dichotomy. By way of a variant, which is applicable if the distance d is sufficiently small, the method according to the invention may be reduced to the first step described above.

In accordance with another variant of the invention, which is preferably applicable when the distance d is larger, the following general method may be used instead of the simplified methods in one or two steps as described above. This method consists of iterating the interpolation step until the desired accuracy is obtained. A compromise must be found from case to case between the number of points tested in the acquisition interval and the number of interpolation iterations so as to optimize the computations.

The general method is described hereinafter:
storage of the received, phase-corrected signals, denoted $r'_k$, computation of the error function $H(\Delta\hat{f})$ of error values comprised in a normalized range $\pm\Delta f_{max} \times T_S$ (where $T_S$ is the duration of the symbol) for deriving a first estimation $\Delta\hat{f}(1)$ of the frequency error $\Delta\hat{f}$, successive iterations for values obtained by parabolic interpolation between the current estimation, denoted $\Delta\hat{f}(i)$, $i>0$ and neighboring values already computed during the first step or a preceding iteration and for which the error function $H(\Delta\hat{f})$ has the strongest amplitude, for deriving new estimations $\Delta\hat{f}(i+1)$ of the frequency error, comparison between the two last estimations: if the difference is higher than a fixed threshold S which is normalized with respect to the symbol frequency, a supplementary iteration is performed, and if not, the last iteration is denoted it, and at the end of the number it of iterations, the estimation of the searched frequency error is denoted $\Delta\hat{f}(it)$, frequency correction of the stored signal $r'_k$ by multiplying it by the exponential function $e^{-2\pi j \cdot k \Delta\hat{f}(it)}$ where $\Delta\hat{f}(it)$ is the estimation obtained at the last iteration, and supply of a frequency corrected signal.

The computation of the error function $H(\Delta\hat{f})$ and successive iterations will now be described in greater detail. The error function $H(\Delta\hat{f})$ is computed for a certain number of values comprised between $-\Delta f_{max} \times T_S$ and $+\Delta f_{max} \times T_S$. The invention recommends computation at L points where L is an integer chosen to be such that $d=2\Delta f_{max} \times T_S/(L-1)$ which corresponds to the desired accuracy of the error. Preferably, the L selected points are uniformly distributed in the interval $\pm\Delta f_{max} \times T_S$, with a pitch which is equal to $d=2\Delta f_{max} \times T_S/(L-1)$. They may be described by the formula $-\Delta f_{max} \times T_S + i \times d$, for i between 0 and L-1. The error corresponding to the maximum value of the amplitude of the function $H(\Delta\hat{f})$ among the L selected points is denoted $H(f)_{max}$.

The computation of the iterations commences by selecting three of these points among which the point $H(f)_{max}$ representing the first error estimation $\Delta\hat{f}(1)$ is present, for determining a new maximum of the error function with the aid of a parabolic interpolation passing through these three points, and thus for a new estimation of the frequency error.

If $H(f)_{max}=-\Delta f_{max} \times T_S$, one considers the points $-\Delta f_{max} \times T_S$; $-\Delta f_{max} \times T_S + d$ and $-\Delta f_{max} \times T_S + 2d$ denoted a, b and c, respectively.

If $H(f)_{max}=\Delta f_{max} \times T_S$, one considers the points $\Delta f_{max} \times T_S - 2d$; $\Delta f_{max} \times T_S - d$ and $\Delta f_{max} \times T_S$, denoted a, b and c, respectively.

If not, one considers the points $H(f)_{max}-d$; $H(f)_{max}$ and $H(f)_{max}+d$ denoted a, b and c, respectively.

Subsequently, a new estimation of the frequency error at one point denoted x is computed, which point is obtained by a parabolic interpolation between the three points selected in accordance with equation (8). One subsequently computes H(X) which will be used in equation (2) during the subsequent iterations. For computing the subsequent iterations:

if $a<X<b$, one computes the new estimation denoted X' with the aid of the equation (8), in which the variables a, b and c are a, X and b, respectively, if $c>X>b$, one computes the new estimation denoted X' with the aid of equation (8), in which the variables a, b and c are b, X and c, respectively, if $X>\Delta f_{max} \times T_S$, a, b and c are $\Delta f_{max} \times T_S - d$; $\Delta f_{max} \times T_S$; X, respectively, if $X<-\Delta f_{max} \times T_S$, a, b and c are X; $-\Delta f_{max} \times T_S$; $-\Delta f_{max} \times T_S + d$, respectively.

The computation of H(X) for the last iteration is not necessary. A supplementary point is computed at each iteration.

At every new iteration, the accuracy of the result improves. However, it is preferable to fix the threshold S in such a way that the iterations stop when the gain in accuracy becomes negligible with respect to the cost of a new iteration, i.e. when the difference between two successive estimations becomes negligible. For example, one will fix a threshold of the order of $10^{-4}$.

The method performed in two steps corresponds to the general method described hereinbefore when the number of parabolic computation iterations in accordance with formula (8), denoted it, is equal to 1.

Figure 4:
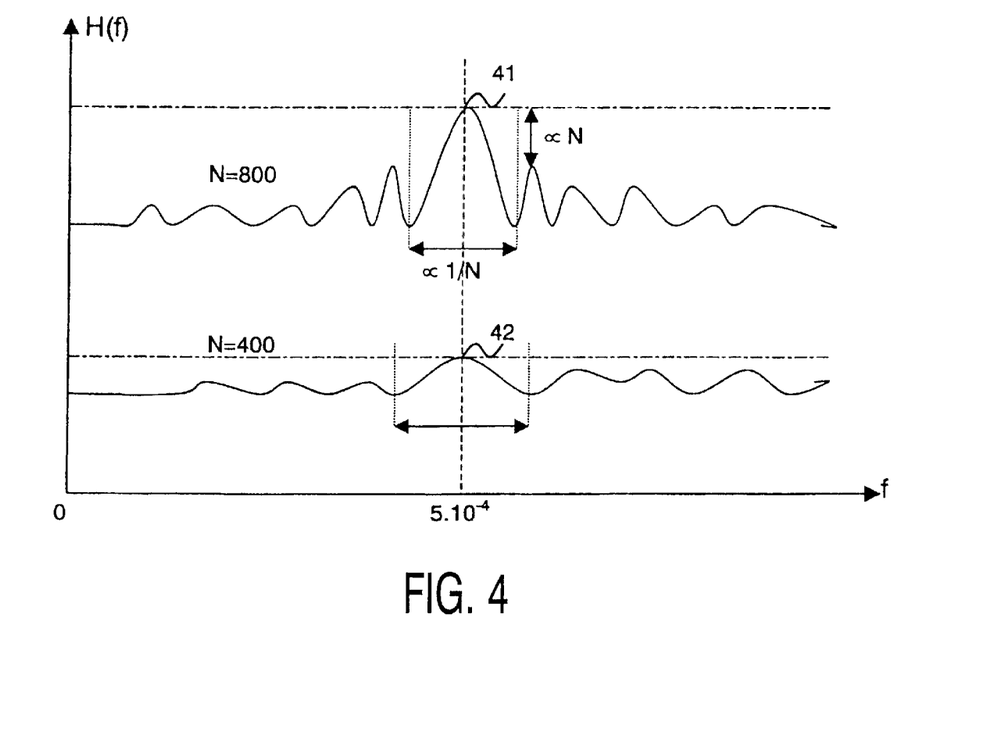
FIG. 4 shows two curves illustrating the function H(f) as a function of the frequency error, obtained with a number of different samples in a channel without noise.

FIG. 4 illustrates, by way of example, the function H(f) for a frequency error which is equal to $5.10^{-4}$ in a channel without noise and for two different values of N (N=400 and N=800). The function shows a maximum amplitude peak 41, 42 situated at a frequency which corresponds to the searched value of the frequency error and several secondary peaks. For a signal without noise, such as that in FIG. 4, the size of the maximum peak is proportional to 1/N (approximately equal to $1/\pi N$ for a QPSK modulation) and the peak amplitude is proportional to N (approximately equal to $\sqrt{2} \times N$ for an average energy $E_S=1$ in a QPSK modulation). The distance between the maximum peak and the secondary peaks is proportional to $1/N$ and the difference between the amplitude of the maximum peak and that of the secondary peaks is proportional to N. For obtaining a satisfactory estimation of the frequency error by means of the parabolic interpolation method according to the invention, it is sufficient to compute H(f) for at least 3 frequencies situated in the interval determined by the size of the maximum peak. For a modulation of the QPSK type, $f_{max}$ and N should in this case be chosen in such a way that $d<1/(2\pi N)$ with $2f_{max}/N=d$. In a real, hence noisy channel, it would be preferable to choose a value of d which is even lower, for example, $d=1/(4\pi N)$.

When N increases, the complexity of the algorithm increases proportionally because the function H(f) must be computed for a larger number of points. This is why in a channel without noise it may be more effective for a packet of L symbols to compute H(f) for N symbols only with N<L. In contrast, in a noisy channel, the function H(f) may undergo distortions, such that it may be preferable to compute it for a larger number of points. Indeed, in the case of strong distortions, the maximum peak cannot correspond to the frequency error. As the difference between the amplitude of the maximum peak corresponding to the searched frequency error and that of the secondary peaks is proportional to N, the distortions are less troublesome as N increases.

Figure 5A:
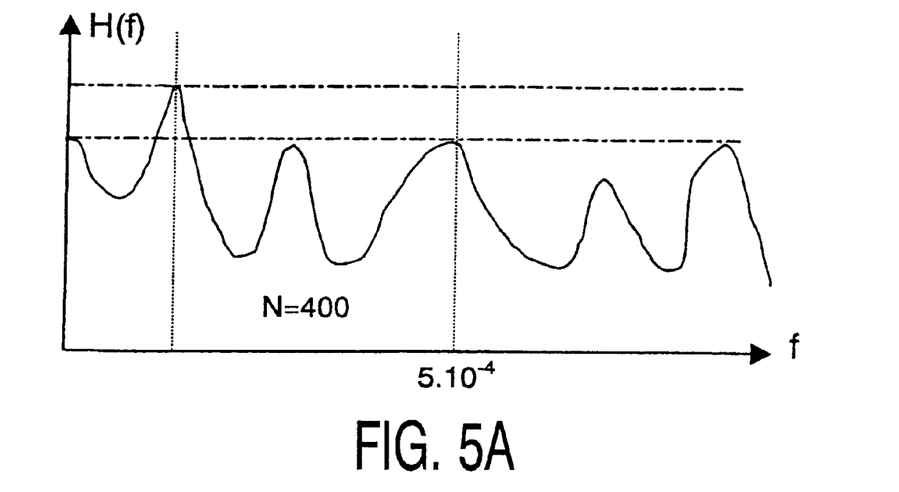
FIGS. 5A and 5B illustrate the behavior of the function H(f) in a noisy channel for two numbers of different samples.
Figure 5B:
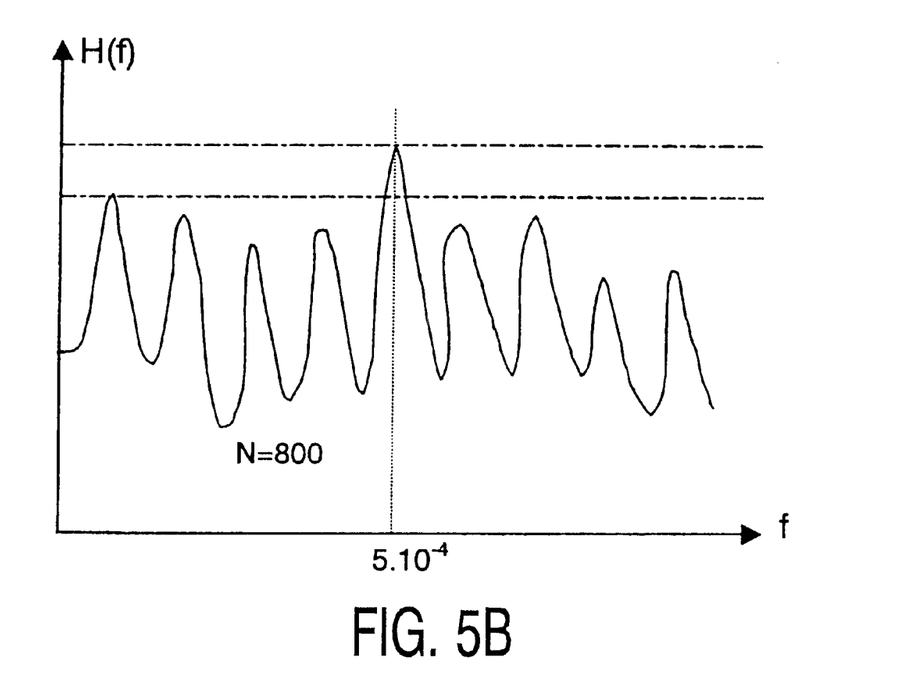

FIGS. 5A and 5B show the behavior of the function H(f) as a function of the frequencies for two values of N, N=400 and N=800, respectively, for a frequency error of $5.10^{-4}$ and a signal-to-noise ratio $SNR=E_S/N_0$ of 2 dB. In the case N=400 illustrated in FIG. 5B, the maximum amplitude peak does not correspond to the frequency error, which means that N is too low for a correct result. In contrast, in the case N=800 illustrated in FIG. 5B, the maximum amplitude peak corresponds to the real frequency error, which means that the value of N is chosen correctly. These curves show that there is a compromise to be found between performance and complexity by fixing the value of N, with $f_{max}$ being given, for determining the frequency error by means of the method according to the invention.

As stated hereinbefore, the invention assumes that the initial phase error has been previously and correctly estimated by means of, for example, a method of the DA type using 50 symbols of the preamble of each packet. Actually, the method according to the invention is sensitive to residual initial phase errors. The following Table, denoted as Table 1, gives the variances of the frequency errors normalized as a function of the residual initial phase errors, denoted $\phi_0-\hat{\phi}_0$ and expressed in radians between parentheses for a signal-to-noise ratio of 4 dB. The variance of the normalized frequency error corresponds to an average of the expression $(\Delta\hat{f}-\Delta\hat{f}_{res})^2$ where $\Delta\hat{f}_{res}$ represents the residual frequency error obtained by means of a conventional method.

TABLE 1

| $\phi_0-\hat{\phi}_0$ | Variance |
|---|---|
| 0 | $6.2\ 10^{-9}$ |
| 0.05 ($\approx 2.8°$) | $8.6\ 10^{-9}$ |
| 0.1 ($\approx 5.7°$) | $1.6\ 10^{-8}$ |
| 0.2 ($\approx 11.4°$) | $5.1\ 10^{-8}$ |

The following Table, denoted Table 2, compares the variances of the normalized frequency error estimations for different signal-to-noise ratios SNR expressed in dB, obtained by means of the method according to the invention, referred to as Invention, and by means of a method of the NDA type referred to as Rife and Boorstyn, denoted R&B, as described in the quoted document. Each algorithm has been executed for N=256 symbols and for a zero frequency error.

TABLE 2

| SNR (dB) | R&B | Invention |
|---|---|---|
| 2 | $5\ 10^{-3}$ | $2.3\ 10^{-7}$ |
| 3 | $2\ 10^{-3}$ | $6.2\ 10^{-8}$ |
| 4 | $6\ 10^{-4}$ | $2\ 10^{-8}$ |
| 5 | $8\ 10^{-7}$ | $1.3\ 10^{-8}$ |

Table 2 shows that the variance obtained by means of the method according to the invention is at least $10^4$ times smaller for a signal-to-noise ratio which is less than or equal to 4 dB, which is generally the case in the network head stations used in the cable or satellite transmission systems.

In accordance with a variant of the invention, the acquisition range $\pm\Delta f_{max}$ may be fixed, for every new packet received from a given transmitter, as a function of the error estimation $\Delta\hat{f}$ obtained for the preceding packets received from the same transmitter. This allows a possible reduction of the interval $\pm\Delta f_{max}$ during the first step as a function of the real performance of the local oscillator of the transmitter terminal and thus a further reduction of the total number of computed points. For example, the lower the error estimation or residual error computed for the preceding packets received from a given terminal, i.e. the more the frequency received is near the theoretical frequency, the more the range $\pm\Delta f_{max}$ may be reduced for the error computation relating to the next packet originating from this terminal.

It should be noted that the invention does not involve the transmission of a pilot signal between the transmitter and the receiver and that it thus applies to transmission systems in which the transmission of such a pilot signal is not provided or is not possible. In other respects, the invention is usable in combination with compensation mechanisms at the transmitting end, based on the estimation made by the receiver.

The invention may be implemented in an advantageous manner in a digital signal processor or DSP comprising at least a random-access memory and at least a read-only memory, internal or external. The random-access memory is used for instantaneously storing the intermediate values of the computations. The read-only memory is used for storing the conventional programs of operation of the receiver as well as a program comprising appropriate instructions carried out by the signal processor, for realizing the method according to the invention.

What is claimed is:

1. A method for estimating a carrier frequency error between received symbols ($r_k$) and transmitted symbols ($c_k$) in a packet transmission system, comprising the steps of:

computing an error function (H($\Delta\hat{f}$)) for error values ($\Delta\hat{f}$) in an acquisition interval ($[-f_{max}, +f_{max}]$) and; deriving an estimation ($\Delta\hat{f}_0$) of the carrier frequency error, the error function (H($\Delta\hat{f}$)) being defined for minimizing a magnitude which is representative of an average distance between the received phase-compensated symbols ($r'_k$) and estimations ($\hat{c}_k e^{j2\pi k \Delta\hat{f}}$) of the received symbols bearing frequency error estimation, obtained by varying the frequency error ($\Delta\hat{f}$) in the acquisition interval ($[-f_{max}, +f_{max}]$) for estimations of the transmitted symbol ($\hat{c}_k$), the estimation ($\Delta \hat{f}_0$) of the carrier frequency error corresponding to the minimum of a function $F(\hat{c}_k, \Delta \hat{f})$ which depends on variables representing an estimation of the transmitted symbol $\hat{c}_k$ and an estimation of a normalized frequency error $\Delta \hat{f}$ in the acquisition interval ($[-f_{max}, +f_{max}]$), respectively, defined by an equation of the type:

$$F(\hat{c}_k, \Delta \hat{f}) = \sum_{k=0}^{N-1} |r'_k - \hat{c}_k e^{j2\pi k \Delta \hat{f}}|^2$$

wherein:

N represents the number of symbols used for computing the frequency error estimation ($\Delta \hat{f}_0$), and r'k is a magnitude which is representative of the received symbols which are corrected in phase.

2. A method as claimed in claim 1 further comprising the step of using a linear modulation in which the estimations of the transmitted symbol ($\hat{c}_k$) are obtained by means of a decision based on a threshold relating to the received phase-compensated symbol ($r'_k$).

3. A method as claimed in claim 1 further comprising the step of using a phase modulation of the QPSK type in which the symbols are represented by complexes, and a threshold decision is made on the basis of the sign of the real and imaginary parts of the received phase-compensated symbol ($r'_k$).

4. A method as claimed in claim 1, further comprising the step of computing refined estimations of a searched frequency error ($\Delta \hat{f}_i$; with i>0), obtained by interpolation between a preceding estimation ($\Delta \hat{f}(i-1)$) and two other estimations corresponding to neighboring error values ($f_0-d$, $f_0+d$) for deriving a new estimation ($\Delta \hat{f}(i+1)$), wherein $f_0$ represents the estimation of the carrier frequency error ($\Delta \hat{f}_0$) computed by the error function ($H(\Delta \hat{f})$), and d is a computing step representing the difference between two consecutive frequencies in the error acquisition range ($[-f_{max}, +f_{max}]$).

5. A method as claimed in claim 4, further comprising the step of obtaining the refined estimations of the searched frequency error ($\Delta \hat{f}_i$; with i>0) by parabolic interpolation in accordance with the formula:

$$\Delta \hat{f}_i = b - \frac{1}{2} \times \frac{(b-a)^2[H(b)-H(c)] - (b-c)^2[H(b)-H(a)]}{(b-a)[H(b)-H(c)] - (b-c)[H(b)-H(a)]}$$

with $a=f_0-d$ and $b=f_0$ and $c=f_0+d$ and wherein H(a) is the value of the error function ($H(\Delta \hat{f})$) when $\Delta \hat{f}$ equals a, H(b) is the value of the error function ($H(\Delta \hat{f})$) when $\Delta \hat{f}$ equals b and H(c) is the value of the error function ($H(\Delta-\hat{f})$) when $\Delta \hat{f}$ equals c.

6. A receiver for performing the method as claimed in claim 1, the receiver comprising:

a memory for storing received symbols ($r'_k$) corresponding to transmitted symbols ($c_k$), a frequency estimator for estimating the carrier frequency error between the received symbols ($r'_k$) and the transmitted symbols ($c_k$), the frequency estimator comprising means for computing the error function ($H(\Delta \hat{f})$) for possible error values ($\Delta \hat{f}$) in the acquisition interval ($[-f_{max}, +f_{max}]$) for deriving the estimation ($\Delta \hat{f}_0$) of the carrier frequency error, and correction means for correcting the frequency error in the stored symbols by means of the estimation by the frequency estimator.

7. A computer program product for a receiver as claimed in claim 6.

8. A head station of a packet transmission system intended to communicate with at least one terminal by means of a transmission channel provided with a direct chain and a return path, comprising a receiver as claimed in claim 6, for receiving packets of symbols on the return path from the at least one terminal.

9. A packet transmission system comprising at least a terminal and a head station, in which the head station comprises a receiver as claimed in claim 6, for receiving packets of symbols from the terminal.

10. A computer program product for a receiver comprising software code portions which, once loaded into the receiver, enable it to perform the steps of the method as claimed in claim 1.

11. A computer program product for a receiver comprising software code portions which, once loaded into the receiver, enable it to perform the steps of the method as claimed in claim 2.

12. A computer program product for a receiver comprising software code portions which, once loaded into the receiver, enable it to perform the steps of the method as claimed in claim 3.

13. A computer program product for a receiver comprising software code portions which, once loaded into the receiver, enable it to perform the steps of the method as claimed in claim 4.

14. A method as claimed in claim 1, further comprising the step of obtaining the estimations of the transmitted symbol ($\hat{c}_k$) by means of a decision based on a threshold relating to the received symbol phase-compensated ($r'_k$).

15. A method for estimating a carrier frequency error between received symbols ($r_k$) and transmitted symbols ($c_k$) in a packet transmission system, comprising the steps of:

computing an error function ($H(\Delta \hat{f})$) for error values ($\Delta \hat{f}$) in an acquisition interval ($[-f_{max}; +f_{max}]$) for deriving an estimation ($\Delta \hat{f}_0$) of the carrier frequency error, the error function ($H(\Delta \hat{f})$) being defined for minimizing a magnitude which is representative of an average distance between the received phase-compensated symbols ($r'_k$) and estimations ($\hat{c}_k e^{j2\pi k \Delta \hat{f}}$) of the received symbols bearing frequency error estimation, obtained by varying the frequency error ($\Delta \hat{f}$) in the acquisition interval ($[-f_{max}, +f_{max}]$) for estimations of the transmitted symbol ($\hat{c}_k$);

computing refined estimations of a searched frequency error ($\Delta \hat{f}_i$; with i>0), obtained by interpolation between a preceding estimation ($\Delta \hat{f}(i-1)$) and two other estimations corresponding to neighboring error values ($f_0-d$, $f_0+d$) for deriving a new estimation ($\Delta \hat{f}(i+1)$), wherein of represents the estimation of the carrier frequency error ($\Delta \hat{f}_0$) computed by the error function ($H(\Delta \hat{f})$), and d is a computing step representing the difference between two consecutive frequencies in the error acquisition range ($[f_{max}, +f_{max}]$); and obtaining the refined estimations of the searched frequency error ($\Delta \hat{f}_i$; with i>0) by parabolic interpolation in accordance with the formula:

$$\Delta \hat{f}_i = b - \frac{1}{2} \times \frac{(b-a)^2[H(b)-H(c)] - (b-c)^2[H(b)-H(a)]}{(b-a)[H(b)-H(c)] - (b-c)[H(b)-H(a)]}$$

with $a=f_0-d$ and $b=f_0$ and $c=f_0+d$ and wherein H(a) is the value of the error function ($H(\Delta \hat{f})$) when $\Delta \hat{f}$ equals a, H(b) is the value of the error function ($H(\Delta \hat{f})$) when $\Delta \hat{f}$ equals b and H(c) is the value of the error function ($H(\Delta \hat{f})$) when $\Delta \hat{f}$ equals c.

16. A method as claimed in claim 15, further comprising the step of obtaining the estimations of the transmitted symbol ($\hat{c}_k$) by means of a decision based on a threshold relating to the received phase-compensated symbol ($r'_k$).

17. A method as claimed in claim 15, further comprising the step of using a phase modulation of the QPSK type in which the symbols are represented by complexes, and a threshold decision is made on the basis of the sign of the real and imaginary parts of the received phase-compensated symbol ($r'_k$).

18. A receiver for performing the method as claimed in claim 15, the receiver comprising:
- a memory for storing received symbols ($r'_k$) corresponding to transmitted symbols ($c_k$),
- a frequency estimator for estimating the carrier frequency error between the received symbols ($r'_k$) and the transmitted symbols ($c_k$), the frequency estimator comprising means for computing the error function ($H(\Delta \hat{f})$) for possible error values ($\Delta \hat{f}$) in the acquisition interval ($[-f_{max}, +f_{max}]$) for deriving the estimation ($\Delta \hat{f}_0$) of the carrier frequency error, and correction means for correcting the frequency error in the stored symbols by means of the estimation by the frequency estimator.

19. A receiver for estimating a carrier frequency error between received symbols ($r_k$) and transmitted symbols ($c_k$) in a packet transmission system, comprising:
- a memory for storing received symbols ($r'_k$) corresponding to transmitted symbols ($c_k$),
- means for performing phase compensation on the received symbols ($r_k$) to obtain phase-compensated symbols ($r'_k$);
- a frequency estimator for estimating the carrier frequency error between the received symbols ($r'_k$) and the transmitted symbols ($c_k$), said frequency estimator comprising means for varying a frequency error ($\Delta \hat{f}$) in an acquisition interval ($[-f_{max}, +f_{max}]$) for estimations of the transmitted symbol ($c_k$) to obtain estimations ($\hat{c}_k e^{j2\pi k \alpha \hat{f}}$) of the received symbols bearing frequency error estimation and means for computing an error function ($H(\Delta \hat{f})$) for error values ($\Delta \hat{f}$) in the acquisition interval ($[-f_{max}, +f_{max}]$) the error function ($H(\Delta \hat{f})$) being defined for minimizing a magnitude which is representative of an average distance between the received phase-compensated symbols ($r'_k$) and the estimations ($\hat{c}_k e^{j2\pi k \Delta \hat{f}}$) of the received symbols bearing frequency error estimation and means for deriving an estimation ($\Delta \hat{f}_0$) of the carrier frequency error from the computed error function ($H(\Delta \hat{f})$); and
- correction means for correcting the phase-compensated symbol ($r'_k$) by means of the estimation ($\Delta \hat{f}_0$) by said frequency estimator,
- the estimation ($\Delta \hat{f}_0$) of the carrier frequency error corresponding to the minimum of a function $F(\hat{c}_k, \Delta \hat{f})$ which depends on variables representing an estimation of the transmitted symbol $\hat{c}_k$ and an estimation of a normalized frequency error $\Delta \hat{f}$ in the acquisition interval ($[-f_{max}, +f_{max}]$), respectively, defined by an equation of the type:

$$F(\hat{c}_k, \Delta \hat{f}) = \sum_{k=0}^{N-1} \left| r'_k - \hat{c}_k e^{j2\pi k \Delta \hat{f}} \right|^2$$

wherein:
- N represents the number of symbols used for computing the frequency error estimation ($\Delta \hat{f}_0$), and
- r'k is a magnitude which is representative of the received symbols which are corrected in phase.

20. A computer program product for a receiver comprising software code portions which, once loaded into the receiver, enable it to perform the steps of the method as claimed in claim 15.

* * * * *